3,597,274
STARCH MANUFACTURE FROM CORN
Donald Lee Gillenwater, Gerald Bernard Pfundstein, and Allen Ross Harvey, Muscatine, Iowa, assignors to Grain Processing Corporation, Muscatine, Iowa
Filed Mar. 2, 1970, Ser. No. 15,571
Int. Cl. C13l 1/02
U.S. Cl. 127—68                                                5 Claims

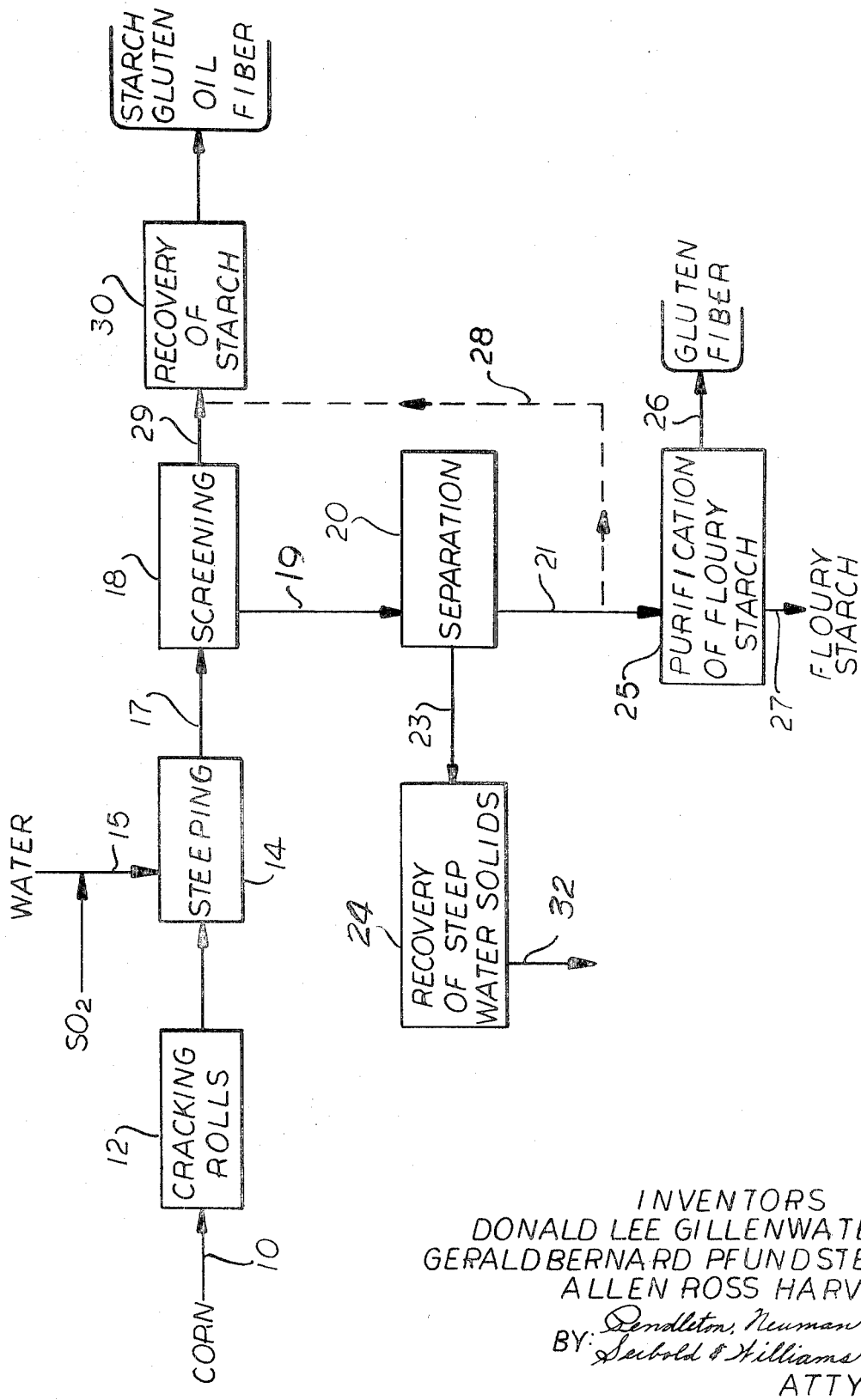

ABSTRACT OF THE DISCLOSURE

Starch is manufactured from corn by a process wherein corn kernels are first subject to cracking so as to fracture the hulls, the cracked corn is then steeped in an aqueous sulfur dioxide solution, a floury starch product is then separated from the steeped slurry, and further starch is recovered from the steeped material from which the said floury starch product has been removed.

---

This invention relates to processes for manufacture of starch from corn.

Starch has been manufactured for many years by essentially the same procedure. In conventional starch wet manufacturing processes whole kernel corn is steeped in a dilute aqueous solution of sulfur dioxide for extended periods of anywhere from 24 to 60 hours or more. Steeping is of great importance with respect to softening the corn kernel so it can then be processed. The steep water is collected and concentrated for the recovery therefrom of soluble components of the corn while the softened corn is then processed by subjecting it to a series of grinding and separating operations to separate the corn kernel components, namely the germ, hull and endosperm, which is composed of individual starch granules imbedded in a proteinaceous matrix (gluten).

Such conventional starch manufacturing processes involve a number of inherent disadvantages. Thus, the long steeping periods limit the rate of starch production and the equipment and energy requirements for concentrating large volumes of steep water and handling of the entire steeped solids slurry are substantial.

Moreover, during picking, shelling, shipping and even during storing, some corn kernels are broken. With current steeping methods there is considerable loss of granular starch to the steep water and this starch is not ordinarily separated but rather is recovered along with the steep water solids, which solids are commonly employed as animal feeds. Loss of granular floury type starch in this manner is not economically desirable since the economic return from animal feeds is less than that received from the sale of starch itself. Also, the presence of starch in the steep water reduces the protein content on the basis of solids therein, thus requiring use of more steep water solids to meet certain protein guarantees when formulated into feedstuffs.

It is a principal object of this invention to provide an improved, simplified process for manufacture of starch which process possesses numerous advantages, among which can be mentioned (1) very short steeping periods resulting in a greatly increased rate of starch production, (2) recovery of a floury starch stream separate from the end-of-the-mill starch stream, (3) reduced equipment and energy requirements, and (4) more efficient recovery from the steep water of soluble corn components.

The process of this invention and various advantages thereof will be further illustrated in conjunction with the accompanying drawing, the sole figure of which is a flow sheet illustrating a presently preferred embodiment. Thus, whole kernel corn is passed via line 10 through any suitable cracking rolls 12 wherein the corn hulls are cracked. The clearance between the cracking rolls should be such as to fracture the hull of the corn kernels but should not be such as to damage the germ. Roll clearances of about 3 or 4 millimeters are generally satisfactory to crack the hulls in several places. If wet corn is employed apparatus suitable for cracking such is employed. The cracked corn is then transferred to steep tank 14 (a series of steeping tanks can be employed in counter-current relationship, if desired) with an aqueous solution of sulfur dioxide introduced through line 15. Sulfur dioxide is used in the steeping operation to inhibit microorganism action and to aid in the extraction of soluble corn components. The concentration of sulfur dioxide in the steep water is in a range from about 0.1 to 0.3 percent by weight. Steeping of the corn is conducted at a temperature in the range from about 120° to 130° F., preferably from 122° to 126° F. In the process of this invention unusually short steeping periods are employed and the steeping is completed in such short periods as 2 hours and generally in periods of from 2 to 16 hours.

After steeping the contents of steep tank 14 are removed via line 17 and washed over a screen or screens 18. Various types of screens can be employed to separate the steep water and a floury starch fraction from the larger particles of germ and fiber. One particularly preferred type of screen to employ at this stage of the process is a DSM screen manufactured commercially by Dorr-Oliver, Inc. The DSM screens are characterized as high capacity, high efficiency wet screens of stationary design which employ a concave screen of wedge bars and are capable of screening in the 50–75 micron range. The undersized discharge from screen 18 comprising the steep water and soluble corn components (proteins, carbohydrates of low molecular weight and ash) as well as finely divided floury starch is passed via line 19 to a cyclone separator 20. From cyclone separator 20 the floury starch product is removed via line 21 while steep water is removed via line 23. At 24, the soluble corn components of the steep water can be recovered by conventional techniques of evaporation and drying and the solids recovered via line 32 and used in feeds, etc.

The floury starch product from separation step 20 together with minor amounts of gluten and fiber can be subjected at 25 to conventional procedures for separating gluten and fibers from starch. The so-separated gluten and fibers can be removed via line 26 and used in animal feeds and the like while the separated floury starch is recovered via line 27. Alternatively, if desired, the floury starch and gluten from separation 20 can be passed via line 28 for further processing with the end-of-the-mill starch stream as will be described hereinafter.

The oversize discharge from screening at 18 is passed via line 29 for recovery of starch by conventional procedures at 30. This stream includes horny type starch, gluten, germ and fibers. The conventional procedures employed for recovery of starch in combination with germ, gluten, fibers, etc. involve milling of the mixture. Thus, this stream can be milled using conventional milling equipment to free the germ, loosen the hull and coarsely disintegrate the endosperm. After milling, the resulting slurry is subjected to a germ separation operation using conventional equipment whereby the germ is separated and recovered from the horny starch, gluten, hulls and corn fragments. The separated germ can be washed and processed for the recovery of corn oil and other valuable byproducts.

The germ-free material can then be screened to effect separation of coarse fiber, grit fragments and hull from starch, gluten and fine fiber. Depending upon operating procedures as commonly practiced, the separated fraction comprising coarse fiber, grit fragments and hulls can be further milled to reduce the particle size and to free residual starch which may be present. This milled fraction can then be slurried with the previously separated fraction containing starch, gluten and fine fiber.

In any event, a water slurry of starch, gluten and fine fiber is generally subjected to a dewatering operation which actually is a separation of starch and fiber inasmuch as a stream of starch, gluten and fine fiber can be separated from coarser fiber and hull fragments as is known. For such dewatering operations, screening centrifuges of the type which utilize high centrifugal force are used to overcome the capillary attraction of liquid to solids. Screening centrifuges of this type are available commercially under the designation "The Mercone Screening Centrifuge." In these units a high centrifugal force is applied along an increasing diameter screen to continuously provide a high capacity separation of the slurry into substantially dry solids and liquid filtrate. In such manner coarse fiber is separated from a liquid filtrate containing starch, gluten and fine fiber. Removal of fine fiber can be accomplished using reels of conventional type, constructed of stainless steel and covered with nylon bolting cloth.

The crude starch product containing some gluten can then be handled as desired depending upon its intended usage. This crude starch product is eminently satisfactory for a variety of commercial applications without further purification. However, if desired, the starch-gluten slurry can be treated by conventional procedures for separation and recovery of the starch with the gluten being separately recovered as a by-product for use in feeds and so forth. Thus, the starch-gluten mixture can be centrifuged with the water and gluten comprising the overflow and starch the underflow.

Those skilled in the art are familiar with the various conventional procedures referred to at 30 in the drawing for recovery of starch, gluten, oil and fiber material. Accordingly, such conventional processing has not been described in detail herein as to do so is not necessary for a full understanding of this invention. An important and unique feature of the starch manufacturing process of this invention is that corn is cracked prior to steeping along with the separation of a floury starch product from the steep water. A comparison of the results of steeping cracked corn for relatively short periods with steeping whole kernel corn is set forth in the table below, the processing of the end-of-mill starch being the same in all cases.

|  | Recovery as percent of dry corn weight | | | | |
| --- | --- | --- | --- | --- | --- |
|  | Cracked corn | | | Whole kernal | |
| Steeptime in hours | 16 | 8 | 2 | 30 to 36 | |
| Germ | 7.9 | 8.0 | 9.3 | 4.0 | 5.1 |
| Floury starch | 6.0 | 5.6 | 3.4 | | |
| End-of-mill starch | 53.2 | 51.9 | 50.7 | 53.6 | 56.5 |
| Protein in starch | 2.03 | 1.72 | 2.45 | 2.03 | 2.08 |
| Total starch | 59.2 | 57.5 | 54.1 | 53.6 | 56.5 |
| Hulls plus protein | 28.5 | 36.5 | 29.7 | 27.0 | 25.9 |

As seen from the above, steeping of the cracked corn for as little as 2 hours yielded a floury starch fraction which can be separated as a separate and valuable product of the process. The yield of the floury starch product by the process of this invention is generally within the range of from about 3 to 10% by weight of the total available starch. The floury starch is loosely deposited in the crown of the corn kernel and the granules thereof are round in shape. As shown herein they are available after short steeping periods of cracked corn kernels.

In contrast, the starch deposited in the glutinous material of the corn kernel is the horny or end-of-the-mill starch. This horny starch becomes compressed as the corn kernels mature and the gluten dehydrates resulting in angular shaped starch granules. This horny starch ordinarily requires prolonged steeping and intensive milling to free it from the gluten matrix. However, such conditions are believed to cause material degeneration of the floury starch present in the crown region of the kernel. By means of the present invention floury starch is recovered immediately after steeping for relatively short periods and before being damaged by further processing (milling, etc.).

Thus, with conventional steeping methods imbibition of water by the corn kernels and extraction of soluble materials from the kernels into the steep water takes place only through the capillary opening at the tip of the kernel. However, by cracking or fracturing the kernels the rate of hydration is markedly increased because the contact area with the steep water is increased. The volume of steep water employed in accordance with this invention is generally within the range from about 1 to 3 gallons per bushel of corn.

Those modifications and equivalents which fall within the spirit of the invention are to be considered a part thereof.

What is claimed is:

1. A process of manufacturing starch from corn which comprises fracturing corn kernels, steeping the fractured corn kernels in an aqueous solution of sulfur dioxide, separating from the steeped slurry a floury starch product, and recovering starch from the steeped material from which the said floury starch product has been removed.

2. A process in accordance with claim 1 wherein steeping is carried out for a period from about 2 to 16 hours.

3. A process in accordance with claim 1 wherein the floury starch product is processed to remove therefrom gluten and fiber material.

4. A process in accordance with claim 1 wherein a water slurry of the steeped material from which the floury starch product has been removed is subjected to milling to separate germ, the germ removed from the said ground steeped material, the degerminated slurry subjected to a dewatering operation to obtain a liquid filtrate containing starch, gluten and fine fiber and the said liquid filtrate treated to recover starch substantially free of gluten and fine fiber.

5. A process in accordance with claim 1 wherein a water slurry of the steeped material from which the floury starch product has been removed is subjected to milling to separate germ, the germ removed from the said ground steeped material, the degerminated slurry subjected to a dewatering operation to obtain a liquid filtrate containing starch, gluten and fine fiber and the said liquid filtrate treated to remove fine fiber therefrom and starch and gluten recovered.

References Cited

UNITED STATES PATENTS

| 2,459,548 | 1/1949 | Singer | 127—68X |
| 2,472,971 | 6/1949 | Hansen | 127—68 |
| 2,573,048 | 10/1951 | Newkirk | 127—68 |
| 2,698,826 | 1/1955 | Peltzer | 127—68UX |
| 3,031,305 | 4/1962 | Weinecke | 127—68X |

OTHER REFERENCES

"Starch: Chemistry and Technology," R. L. Whistle, ed., vol. II, 32–38, Academic Press, New York, 1967.

MORRIS O. WOLK, Primary Examiner

S. MARANTZ, Assistant Examiner